(12) United States Patent  
Lengeling et al.

(10) Patent No.: US 7,808,521 B2
(45) Date of Patent: Oct. 5, 2010

(54) MULTIMEDIA CONFERENCE RECORDING AND MANIPULATION INTERFACE

(75) Inventors: Gerhard Hermann Johannes Lengeling, Los Altos, CA (US); Jeffrey Chandler Moore, Daly City, CA (US); Ryan Salsbury, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 1181 days.

(21) Appl. No.: 11/329,354

(22) Filed: Jan. 9, 2006

(65) Prior Publication Data

US 2007/0165105 A1    Jul. 19, 2007

(51) Int. Cl.
*H04N 7/15* (2006.01)

(52) U.S. Cl. ............... 348/14.08; 379/202.01

(58) Field of Classification Search ........... 348/14.08, 348/14.09, 14.01; 379/202.01
See application file for complete search history.

(56) References Cited

U.S. PATENT DOCUMENTS

| | | | | |
|---|---|---|---|---|
| 5,539,741 | A * | 7/1996 | Barraclough et al. ... | 379/202.01 |
| 7,598,975 | B2 * | 10/2009 | Cutler ................. | 348/14.08 |

\* cited by examiner

*Primary Examiner*—Stella L Woo
(74) *Attorney, Agent, or Firm*—Hickman Palermo Truong & Becker LLP (57) ABSTRACT

A technique is provided for recording and manipulating a multimedia conference. For example, an audio and/or video conference is conducted via computer and the audio data from a set of one or more participants in an audio conference is received and recorded and stored, and the audio data for each participant is recorded onto a separate track of a file.

53 Claims, 4 Drawing Sheets

MULTIMEDIA CONFERENCE RECORDING AND MANIPULATION INTERFACE

FIELD OF THE INVENTION

The present invention relates to multi-participant conferences, and more specifically to a technique for recording multi-participant conferences.

BACKGROUND

Techniques have long existed for conducting voice conferences via telephone. More recently, techniques have come to exist for conducting video conferences. The advent of computers and the decreasing price of accessories such as video cameras that may be coupled to a computer now allow these voice and video conferences to be conducted utilizing computer technology.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

For illustrative purposes, embodiments of the invention are described in connection with a mechanism for authoring audio feeds with associated images. Various specific details are set forth herein and in the Figures, to aid in understanding the present invention. However, such specific details are intended to be illustrative, and are not intended to restrict in any way the scope of the present invention or the various embodiments of the invention as claimed herein. In addition, the particular screen layouts, appearance, and terminology as depicted and described herein are intended to be illustrative and exemplary and in no way limit the scope of the invention or the various embodiments of the invention as claimed herein.

OVERVIEW

Techniques are described herein for recording a conference. The recorded conference may be an audio-only conference, or an audio-visual conference that includes some form of visual component. According to one embodiment, the audio produced by different participants in the conference is recorded on different tracks within the same file. That file may be supplemented with visual content as well. For example, digital images or video clips of a participant may be automatically associated with the track that includes the audio of the participant. In one embodiment, a visual image of a participant is associated with the audio track of the participant each time the participant starts talking during the conference.

IMPLEMENTATION OVERVIEW

In one embodiment, the techniques described herein may be implemented in a conventional personal computer system, such as an iMac, Power Mac, or PowerBook (available from Apple Computer, Inc. of Cupertino, Calif.), running an operating system such as Mac OS X (also available from Apple Computer, Inc.). It will be recognized that the techniques described hereafter can be implemented on other devices as well, such as handhelds, personal digital assistants (PDAs), mobile telephones, consumer electronics devices, and the like. In one embodiment, the techniques are performed by executing instructions embodied in the GarageBand and iChat software package (available from Apple Computer, Inc. of Cupertino, Calif.), running an operating system such as Mac OS X (also available from Apple Computer, Inc.).

Instructions for executing the techniques can be embodied in other software that runs on the personal computer. Such instructions may be included as add-on software, or it can form part of the operating system itself, or it can be a feature of an application that is bundled with the computer system or sold separately.

As shall be described in greater detail hereafter, the techniques may include presenting output on a display screen that is connected to the personal computer. In addition, the invention makes use of input provided to the computer system via input devices such as a keyboard, mouse, touchpad, or the like. Such hardware components, including their operation and interactions with one another and with a central processing unit of the personal computer, are well known in the art of computer systems and therefore are not depicted here. Several Figures are presented as screen shots depicting examples of the user interface as it might appear on a display screen or other output device.

RECORDING AND MANIPULATING A CONFERENCE

Figure 1:
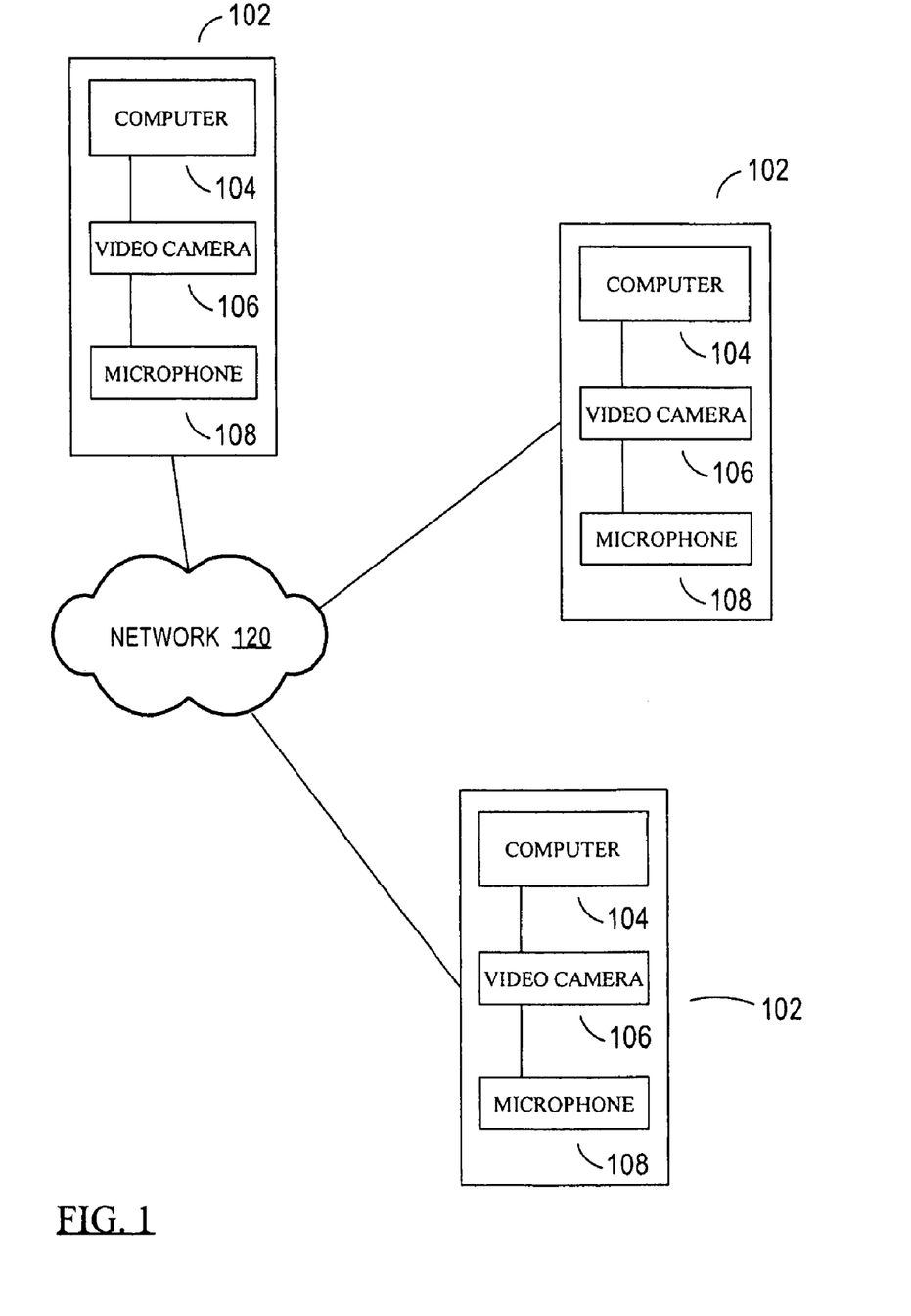
FIG. 1 is an illustration of a video conference using computers and a network, according to an embodiment of the invention.

An audio and/or video conference may be conducted using computers, video cameras connected to the computers, and a network such as the Internet. FIG. 1 is an illustration of a video conference using computers and a network, according to an embodiment of the invention. In FIG. 1, the participants 102 utilize a computer 104 which is connected to a video camera 106 and a microphone 108. While the illustrated embodiment shows the computer, video camera and microphone as separate pieces of equipment, the video camera and microphone may alternatively be one unit. According to other embodiments, the computer, video camera and/or microphone may all be one unit.

The computers of the participants 102 are connected via a network 120, over which the audio and video data are transmitted. In one embodiment, this network is a Local Area Network (LAN), while other embodiments exist in which the network is a Wide Area Network (WAN) such as the Internet, or a Virtual Private Network (VPN). According to an embodiment, the computers comprise nodes of a peer-to-peer (P2P) network.

Figure 2:
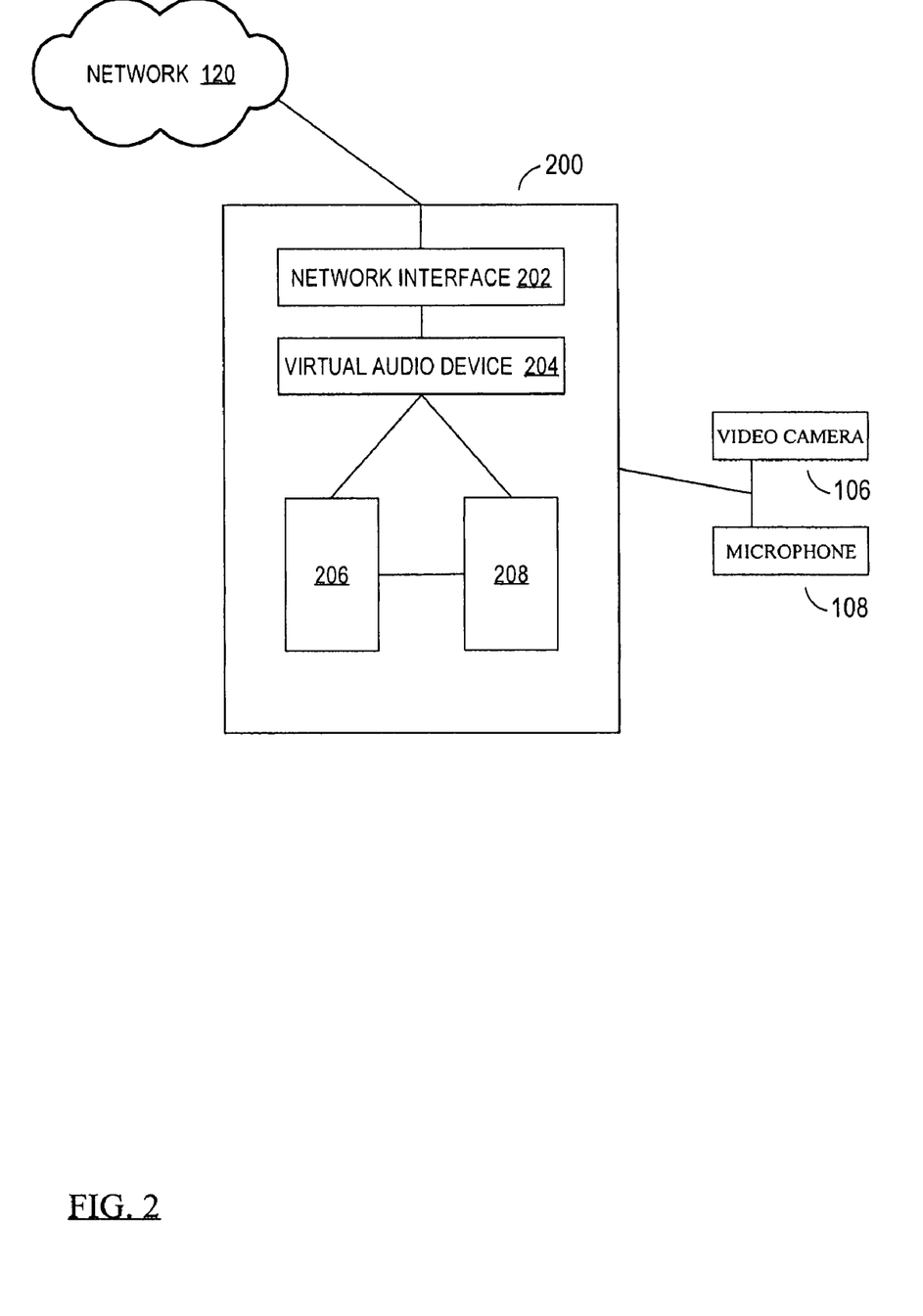
FIG. 2 illustrates a computer used by a participant to the conference upon which the conference will be recorded and manipulated, according to an embodiment of the invention.

FIG. 2 illustrates an embodiment of a computer 200 used by a participant to the conference upon which the conference will be recorded and manipulated. A network interface 202 handles the transmission of data between the network 120 and the computer 200. According to an embodiment, this data may be audio data from an audio conference with other participants, video data from a video conference with other participants, or both. According to an embodiment, once the data is handled by the network interface, the data is passed to a virtual audio device 204.

THE VIRTUAL AUDIO DEVICE

The virtual audio device 204 takes audio data sent to it and makes the audio data available for other processes and/or applications. The data may be any type of data, including audio and/or video data. According to an embodiment, the data may be transformed by the virtual audio device 204, for example, adjusting the sample rate of the audio stream to meet the requirements of the recording application.

According to an embodiment, the virtual audio device 204 appears to other processes and/or applications as an output device with multiple channels. According to an embodiment, the virtual device 204 is configured by the conferencing application so that each participant in the conference will have their audio feed available as a separate channel from the virtual audio device 204. Applications desiring to receive audio data from the conference may connect to the virtual audio device 204 and receive the audio data on as many channels as are available. By separating the audio from each participant on separate channels, it is possible to identify which participant is speaking at a given time, as discussed herein.

By acting as a conduit for data streams, the virtual audio device 204 abstracts the data in the audio stream and allows for more efficient handling by multiple processes and/or applications. It also allows all the applications involved, both the senders and the receivers, to use the same code for sending the data to other processes as they do for dealing with real audio devices.

THE CONFERENCING APPLICATION

According to an embodiment, at least one application 206, 208 receives the audio data from the virtual audio device 204 and the video data from the network interface 202. According to an embodiment, the audio and video data are separately channeled to the applications 206, 208, while other embodiments envision the data being combined.

The conferencing application 206 receives audio data from a set of one or more participants in an audio conference. The set of participants from which audio data is received may be the entire number of participants in the conference, or if audio data is not received from all the participants, then the set of participants is a subset of all participants in the audio conference.

According to an embodiment, the audio and video data, in the case of a video conference, or just the audio data in the case of an audio conference, are utilized by a conferencing application 206 such as iChat, available from Apple Computer as discussed earlier.

The conferencing application can be embodied in other software that runs on the personal computer. The conferencing application 206 is responsible for managing the audio and/or video streams comprising the conference. According to an embodiment, the conferencing application 206 is in communication with a recording application 208 such as GarageBand, available from Apple Computer as discussed earlier. The recording application 208 can be embodied in other software that runs on the personal computer.

THE RECORDING APPLICATION

According to an embodiment, the recording application 208 is in communication with the conferencing application 206, the virtual audio device 204, and/or the data stream from the network 120. According to an embodiment, the conferencing application 206 and the recording application 208 may be combined into one application.

According to an embodiment of the invention, the recording application 208 receives the audio data from the virtual audio device 204. The recording application 208 may alternatively receive the audio data without utilizing the virtual audio device and/or from the conferencing application 206.

According to an embodiment, the recording application 208 receives the audio data on separate channels, such that the audio from each participant is on a separate channel than the audio from each other participant. According to an embodiment, the audio data received from a participant is a recording of audio produced by the participant during the conference. According to various embodiments, "recording" may consist of temporarily storing and/or transmitting electronic bits of data representing audio and/or video files and/or streams, as well as writing data representing audio and/or video files and/or streams to physical storage.

According to an embodiment, the recording application 208 stores the audio data in a file, where the file is comprised of separate tracks, and where each track associated with a specific participant in the conference. According to an embodiment, this is accomplished by utilizing separate channels for the audio data emanating from each participant to the conference.

By storing the audio of each participant on a separate track in a file, the file may be processed later and the separate tracks manipulated. For example, the tracks may have their dynamic range normalized. One track may contain excessive ambient noise, while another track may be too soft. Each track may be independently manipulated and processed to remedy these deficiencies. According to an embodiment, the tracks may be moved in time, such that an instance of two or more people talking over each other may be eliminated. Each track of a person talking at the same time may be moved in time such that each person speaks in turn.

VIDEO DATA

Each participant to the conference may utilize visual data, such as an avatar, to represent themselves to other participants. According to an embodiment, this visual data is an image file chosen by the participant. The image file may be a static image or a video clip. For example, a participant to a conference may choose an image (such as an "avatar") to be displayed in the conferencing application 206 to represent themselves to other users.

According to an embodiment, the visual data for a participant is a video image or clip of the participant that is recorded during the conference. For example, in lieu of a pre-stored avatar, the video camera 106 of the participant may capture images of the participant at a point during the conference, and this image or video clip may be used by the participant to the conferencing application 206 to represent themselves to other users.

ASSOCIATING VISUAL DATA WITH THE AUDIO RECORDING

According to an embodiment, an image or video clip from each participant is used by the computer recording the conference to represent each of the separate participants. Referring again to the embodiment illustrated in FIG. 2, the recording application 208 on a computer recording the conference requests an image of a participant. The request is handled by the conferencing application 206, which takes an image of the selected participant and passes the image to the recording application 208. A still image and/or video clip may be passed from the conferencing application to the recording application.

As mentioned above, the recording application 208 on a computer recording the conference stores the audio of each participant on a separate track in a file. According to an embodiment, the recording application begins storing the data (making the recording) in response to user input. In response to the same user input, a notification may be sent to all participants informing them of the recording. This could be done, for example, to satisfy legal requirement regarding wiretapping and privacy laws.

According to an embodiment, each audio channel may be monitored such that it may be detected when the participant associated with the channel begins or finishes speaking. According to an embodiment, this detection is accomplished by monitoring the dynamic changes of the audio signal amplitude ("intensity level") of the channel. According to an embodiment, this monitoring may be controlled by the conferencing application 206 and/or the recording application 208. When an increase in dynamic level on a channel associated with a participant is detected above a certain threshold, it may be assumed that the participant on the channel has begun speaking. When a following decrease in dynamic level below a certain threshold is detected, it may be assumed that the participant has stopped speaking. According to an embodiment, techniques may be used to differentiate between a participant actually beginning to speak and an increase in background noise or a sound not caused by the participant speaking.

Once it is detected that a participant has begun speaking, visual data may be associated with the participant's track. As mentioned above, this visual data may be a still image or a video clip. The visual data may be associated with the track each time the participant begins speaking. The visual data may also be associated with the location, within the audio track, that corresponds to the time that the participant began speaking.

For example, assume that (1) a particular participant in the conference is represented by a particular avatar, (2) the audio of the conference is being recorded into a file, and (3) the particular participant begins speaking during the conference at times T1, T8, and T23. The audio spoken by the participant at times T1, T8 and T23 would begin at corresponding locations (L1, L8 and L23) within the file. Under these circumstances, the recording application 208 may store within the file, at locations L1, L8 and L23, references to the avatar of the particular participant.

CAPTURED VISUAL DATA

In the example given above, the visual data (an avatar) is used to visually represent a participant. Consequently, associations to avatars are stored in the file that contains the audio of the conference. However, other forms of visual data may be used to represent participants in a conference. For example, in one embodiment, the conference is a videoconference and the visual data is captured from a video feed of the videoconference. For example, when a participant to a video conference begins speaking, a still image taken from the video feed emanating from the participant may be captured by the conferencing application 206 and passed to the recording application 208. The recording application 208 associates the visual data with the participant's audio track at the time that the participant began speaking. According to an embodiment, any latency occurring between the time the participant began speaking and the capturing of the visual data is compensated for. In one embodiment, the visual data is associated with the track a specified length of time earlier than the visual data actually arrived, the length of time corresponding to a length of time equal to the latency period.

USER INTERFACE FOR CONTROLLING THE RECORDING

Figure 3:
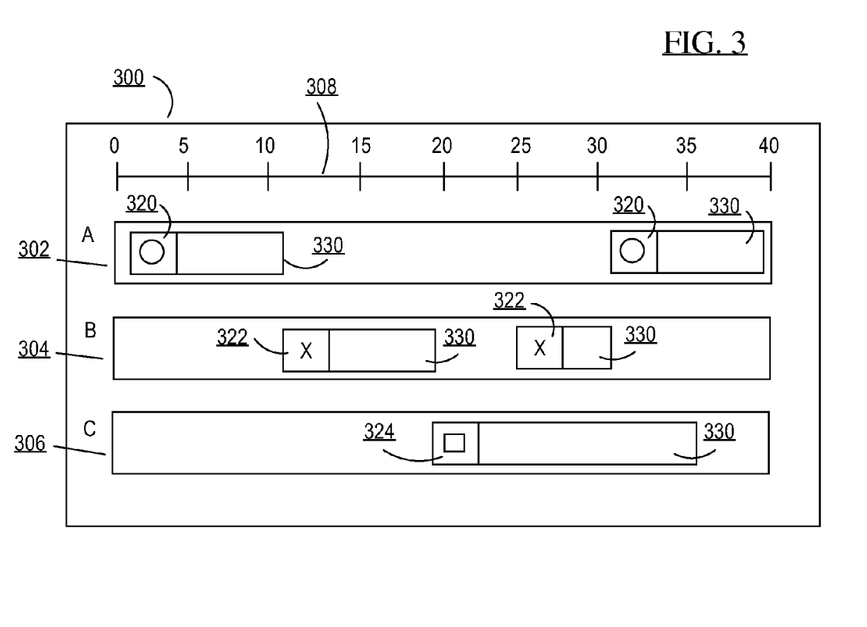
FIG. 3 illustrates an example of a graphical user interface controlling the recording of a conference, according to an embodiment of the invention.

FIG. 3 illustrates an embodiment of an example of a graphical user interface controlling the recording of a conference. In FIG. 3, the file 300 in which the recording of a conference is stored is comprised of three tracks 302-306. Each of the tracks represents a participant to the conference, so there are three participants in the conference illustrated in FIG. 3. If there were four participants, there would be four tracks, and so on.

A timeline 308 is used to mark the beginning and end of the conference and at what points each participant speaks. The timeline illustrated in FIG. 3 begins at zero seconds and ends at 40 seconds. This corresponds to a 40-second long conference. Conferences may comprise any length of time. At the beginning of the conference illustrated in FIG. 3, or at time zero, participant A begins to speak. This is detected by the conferencing application 206 and a message is passed to the recording application 208 which is recording and storing the file 300 illustrated in FIG. 3. Alternatively, the recording application may detect a participant beginning to speak.

As a result of participant A beginning to speak, an image 320 is inserted into the track corresponding to participant A 302 at time zero. This image may be independently sent by the conferencing application 206 or sent in response to a request from the recording application 208. In the event of an audio conference, the image may be a user-selected avatar or a still image captured by a digital camera connected to the computer at participant's location. In the event of a video conference, the image may be a user-selected avatar or a portion of the video feed emanating from the participant's computer. The portion of the video feed may be a still image capture of the feed or a video clip of the feed. According to an embodiment, the image is captured at the point the participant begins speaking. In the example illustrated in FIG. 3, the image 320 is a capture of the video feed taken at time zero, or when participant A began speaking. The image may not have been received by the recording application at time zero due to latency, but the discrepancy in time may be automatically adjusted.

According to an embodiment, a visual indicator 330 is placed along the track indicating the duration of time a participant speaks. The image 320 associated with the track may be placed at any point within or outside the visual indicator 330. In the example illustrated by FIG. 3, participant A begins speaking at time zero and stops speaking at time 10. The visual indicator 330 along the track corresponding to participant A 302 stops at time 10. At time 10, participant B begins speaking, and an image 322 is inserted into the track corresponding to participant B 304 at this point. Participant B stops speaking at time 20, and the visual indicator 330 along the track corresponding to participant B 304 stops at this point. At time 20, participant C begins speaking, and an image 324 is inserted into the track corresponding to participant C 306 at this point. At time 25, participant B begins to speak while participant C continues speaking. In response to a detection that participant B has begun speaking, an image 322 is inserted into the track corresponding to participant B 304 at this point. The image 322 may be the same image as previously used, or may be a new image taken from the video feed of the conference and adjusted for latency.

Participant B continues speaking along with participant C until time 30, and the visual indicator 330 stops at this point along the track corresponding to participant B 304. At time 30, participant A begins speaking again while participant C continues speaking. In response to the conferencing application detecting that participant A has begun speaking, an image 320 is inserted into the track corresponding to participant A 302 at this point. Participant C stops speaking at time 35 while participant A is still speaking, and the visual indicator 330 along the track corresponding to participant C 306 stops at this point. Participant A continues to speak until time 40, and the visual indicator 330 along the track corresponding to participant A 302 stops at time 40.

CONFERENCE PLAYBACK

Figure 4:
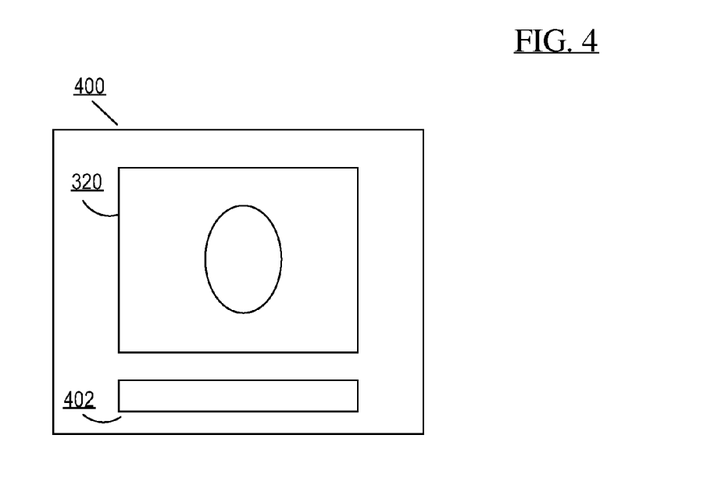
FIG. 4 is an illustration of the display of a device playing back the conference file, according to an embodiment of the invention.

FIG. 4 is an illustration of the display of a device playing back the conference file as discussed with regard to FIG. 3. In FIG. 4, a display screen 400 of a device capable of playing back the file containing the conference audio and/or video is shown. The device is playing back the file during a portion of time that participant A was speaking. According to an embodiment, the device reads the track data recorded by the recording application 308 and displays the image 320 associated with participant A while the audio of participant A is being played. A GUI element 402 may be provided illustrating the timeline of the file, as may any number of additional GUI elements and controls specific to the playback device or software being utilized on the playback device to play the conference file.

HARDWARE OVERVIEW

Figure 5:
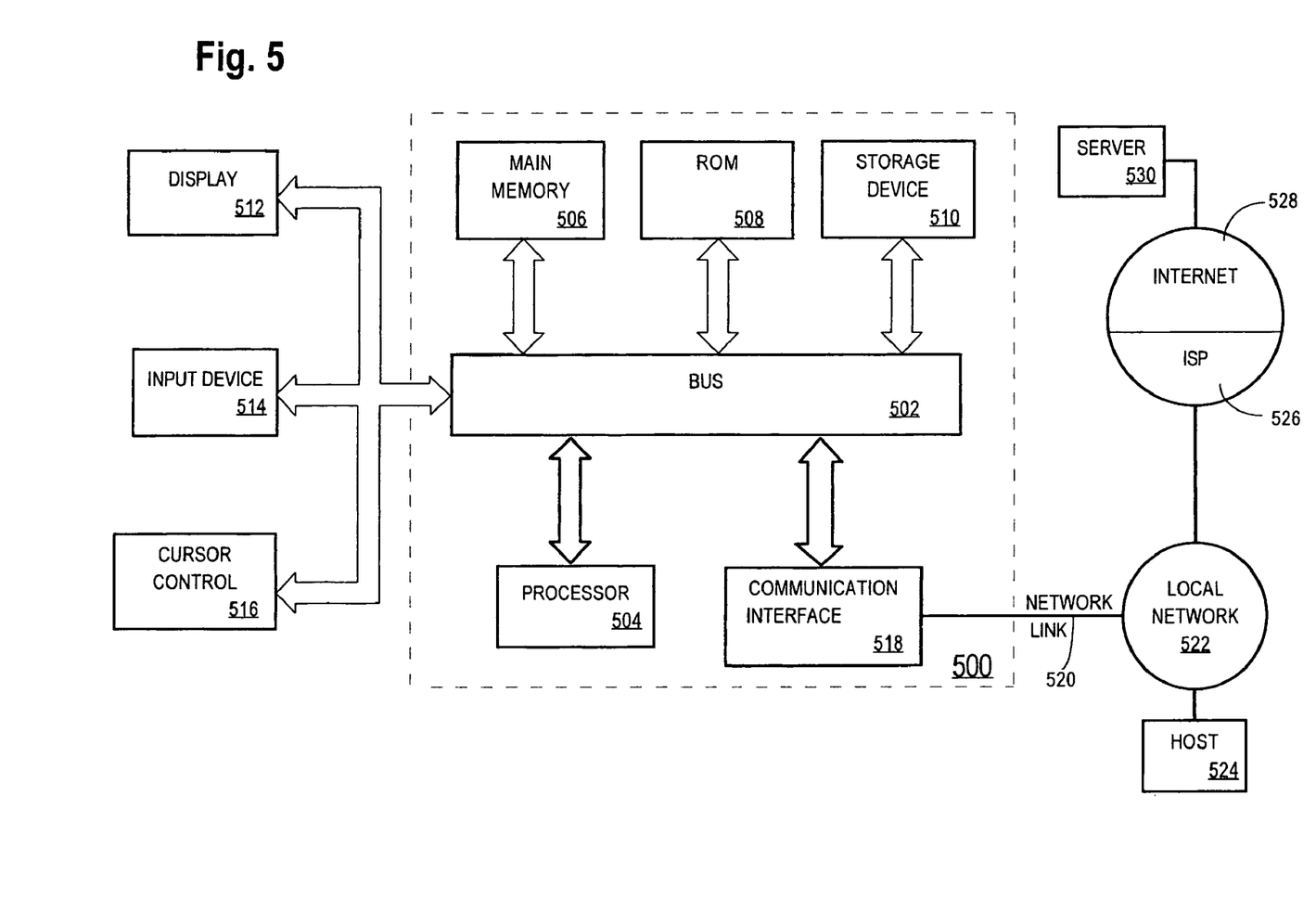
FIG. 5 is a block diagram of a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 55. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 55. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502.

Bus 502 carries the data to main memory 506, from which processor 504 retrieves and executes the instructions. The instructions received by main memory 506 may optionally be stored on storage device 55 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

EXTENSIONS AND ALTERNATIVES

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

Further, in the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving audio data from a set of two or more participants in a conference, wherein the audio data for each participant in the set of two or more participants is a recording of audio produced by the participant while participating in the conference; and
   wherein the conference is one of an audio conference and a videoconference;
   storing the audio data for each participant of the set of two or more participants onto a separate track of a file to produce a single file that has the audio produced by only a first participant of the two or more participants in a first track and the audio produced by only a second participant of the two or more participants in a second track;
   wherein the method is performed by one or more computing devices.

2. The method of claim 1, wherein the set of two or more participants is a subset of all participants in the conference.

3. The method of claim 1, further comprising:
   associating visual data with at least one track within the file, wherein the visual data associated with a given track represents the participant whose audio data is recorded in the given track.

4. The method of claim 3, wherein the visual data is a still image.

5. The method of claim 3, wherein the visual data is a video clip.

6. The method of claim 3, wherein the visual data is selected by the participant whose audio data is recorded in the given track.

7. The method of claim 3, further comprising: automatically adjusting the association of the visual data with the track to correct for transmission latency.

8. The method of claim 1, further comprising: adjusting the audio data to normalize the loudness for each participant.

9. The method of claim 1, wherein the audio data is received by a virtual audio device that makes the audio data available to separate processes.

10. The method of claim 9, wherein the virtual audio device receives audio and video data produced by the participants during the conference.

11. The method of claim 9, wherein the virtual audio device appears to the separate processes as an output device with multiple channels.

12. The method of claim 9, wherein the virtual audio device synchronizes the audio data.

13. The method of claim 1, wherein the data is transmitted to each participant utilizing peer-to-peer networking.

14. The method of claim 1 wherein said conference is a videoconference.

15. The method of claim 14, further comprising: synchronizing the audio and video data.

16. The method of claim 1, wherein the conference is an audio conference.

17. A method comprising:
receiving audio data from a set of two or more participants in conference, wherein the audio data for each participant in the set of two or more participants is a recording of audio produced by the participant while participating in the conference;
wherein the conference is one of an audio conference and a videoconference;
monitoring the audio data for each participant while recording the audio data into a file;
while monitoring the audio data, determining when a participant has begun speaking; and
in response to determining that a participant has begun speaking, storing visual information in the file that reflects which participant has begun speaking;
wherein the position in the file at which the visual information is stored is dictated by when the participant began speaking;
wherein the method is performed by one or more computing devices.

18. The method of claim 17, wherein the set of two or more participants is a subset of all participants in the conference.

19. The method of claim 17, further comprising:
storing the audio data for each participant of the set of two or more participants onto a separate track of the file; and
in response to determining that a participant has begun speaking, storing into the file an association between the track containing the audio data for the participant and visual data that represents the participant.

20. The method of claim 19, wherein the visual data is a still image.

21. The method of claim 19, wherein the visual data is a video clip.

22. The method of claim 19, wherein the visual data is selected by the participant with whom the image is associated.

23. The method of claim 19, further comprising: automatically adjusting the association of the visual data with the track to correct for transmission latency.

24. The method of claim 17, wherein the conference is a videoconference and wherein the visual information that is stored in the file when a participant begins speaking is based on video of the videoconference recorded when the participant begins speaking.

25. The method of claim 24, further comprising storing the audio data for each participant onto a separate track of the file.

26. The method of claim 24, further comprising automatically adjusting the association of the visual data with the track to correct for transmission latency.

27. The method of claim 17, wherein the conference is an audio conference.

28. The method of claim 17, wherein the conference is a videoconference.

29. A computer-readable storage medium storing instructions which, when executed by one or more processors, cause the one or more processors to perform:
receiving audio data from a set of two or more participants in a conference, wherein the audio data for each participant in the set of two or more participants is a recording of audio produced by the participant while participating in the conference; and
wherein the conference is one of an audio conference and a videoconference;
storing the audio data for each participant of the set of two or more participants onto a separate track of a file to produce a single file that has the audio produced by a first participant of the audio conference in a first track and the audio produced by a second participant of the conference in a second track.

30. The computer-readable storage medium of claim 29, wherein the set of two or more participants is a subset of all participants in the audio conference.

31. The computer-readable storage medium of claim 29, wherein the instructions include instructions for:
associating visual data with at least one track within the file, wherein the visual data associated with a given track represents the participant whose audio data is recorded in the given track.

32. The computer-readable storage medium of claim 31, wherein the visual data is a still image.

33. The computer-readable storage medium of claim 31, wherein the visual data is a video clip.

34. The computer-readable storage medium of claim 31, wherein the visual data is selected by the participant whose audio data is recorded in the given track.

35. The computer-readable storage medium of claim 31, wherein the instructions include instructions for automatically adjusting the association of the visual data with the track to correct for transmission latency.

36. The computer-readable storage medium of claim 29, wherein the instructions include instructions for adjusting the audio data to normalize the loudness for each participant.

37. The computer-readable storage medium of claim 29, wherein the audio data is received by a virtual audio device that makes the audio data available to separate processes.

38. The computer-readable storage medium of claim 37, wherein the virtual audio device receives audio and video data produced by the participants during the conference.

39. The computer-readable storage medium of claim 37, wherein the virtual audio device appears to the separate processes as an output device with multiple channels.

40. The computer-readable storage medium of claim 37, wherein the virtual audio device synchronizes the audio data.

41. The computer-readable storage medium of claim 29, wherein the data is transmitted to each participant utilizing peer-to-peer networking.

42. The computer-readable storage medium of claim 29 wherein said conference is a videoconference.

43. The computer-readable storage medium of claim 42, wherein the instructions include instructions for synchronizing the audio and video data.

44. The computer-readable storage medium of claim 29, wherein the conference is an audio conference.

45. A computer-readable storage medium storing instructions which, when executed by one or more processors, cause the one or more processors to perform:
receiving audio data from a set of two or more participants in a conference, wherein the audio data for each participant in the set of two or more participants is a recording of audio produced by the participant while participating in the conference;
wherein the conference is one of an audio conference and a videoconference;
monitoring the audio data for each participant while recording the audio data into a file;
while monitoring the audio data, determining when a participant has begun speaking; and
in response to determining that a participant has begun speaking, storing visual information in the file that reflects which participant has begun speaking;

wherein the position in the file at which the visual information is stored is dictated by when the participant began speaking.

46. The computer-readable storage medium of claim 45, wherein the set of two or more participants is a subset of all participants in the audio conference.

47. The computer-readable storage medium of claim 45, wherein the instructions include instructions for:
   storing the audio data for each participant of the set of two or more participants onto a separate track of the file; and
   in response to determining that a participant has begun speaking, storing into the file an association between the track containing the audio data for the participant and visual data that represents the participant.

48. The computer-readable storage medium of claim 47, wherein the visual data is a still image.

49. The computer-readable storage medium of claim 47, wherein the visual data is a video clip.

50. The computer-readable storage medium of claim 47, wherein the visual data is selected by the participant with whom the image is associated.

51. The computer-readable storage medium of claim 47, wherein the instructions include instructions for automatically adjusting the association of the visual data with the track to correct for transmission latency.

52. The computer-readable storage medium of claim 45, wherein the conference is an audio conference.

53. The computer-readable storage medium of claim 45, wherein the conference is a videoconference.

* * * * *